United States Patent [19]

Abramson

[11] Patent Number: 4,814,749

[45] Date of Patent: Mar. 21, 1989

[54] PROTECTION SYSTEM

[75] Inventor: Monte Abramson, Flushing, N.Y.

[73] Assignee: Southern Integrity, Inc., West Palm Beach, Fla.

[21] Appl. No.: 104,806

[22] Filed: Oct. 2, 1987

[51] Int. Cl.[4] .................. G08B 13/00; B02C 23/00
[52] U.S. Cl. ............................. 340/541; 241/36; 340/568
[58] Field of Search ............. 340/541, 545, 548, 668, 340/568, 571, 574; 200/61.18, 61.19; 109/38–44, 23, 29; 241/36, 30, 301

[56] References Cited

U.S. PATENT DOCUMENTS

| 4,236,463 | 12/1980 | Westcott | 109/44 X |
| 4,479,579 | 10/1984 | Miklos | 206/309 |
| 4,532,566 | 7/1985 | Horimoto | 360/132 |
| 4,549,658 | 10/1985 | Sfikas | 206/614 |
| 4,567,983 | 2/1986 | Morris | 206/387 |
| 4,572,369 | 2/1986 | Morris | 206/387 |
| 4,615,490 | 10/1986 | Goldhammer | 241/36 |
| 4,664,317 | 5/1987 | Morton | 241/36 |

Primary Examiner—Glen R. Swann, III
Assistant Examiner—Thomas J. Mullen, Jr.
Attorney, Agent, or Firm—Steele, Gould & Fried

[57] ABSTRACT

An audio and/or video system for transferring information stored on a disc, tape or film which prevents unauthorized or unintentional use or disclosure to third parties of the information contained on the disc, tape of film. The disc, tape or film is contained within a cassette having structure for sensing intrusion into the cassette. The sensing structure triggers an abrasive or cutting device which destroys the information on the disc, tape or film when intrusion into the cassette is sensed.

26 Claims, 6 Drawing Sheets

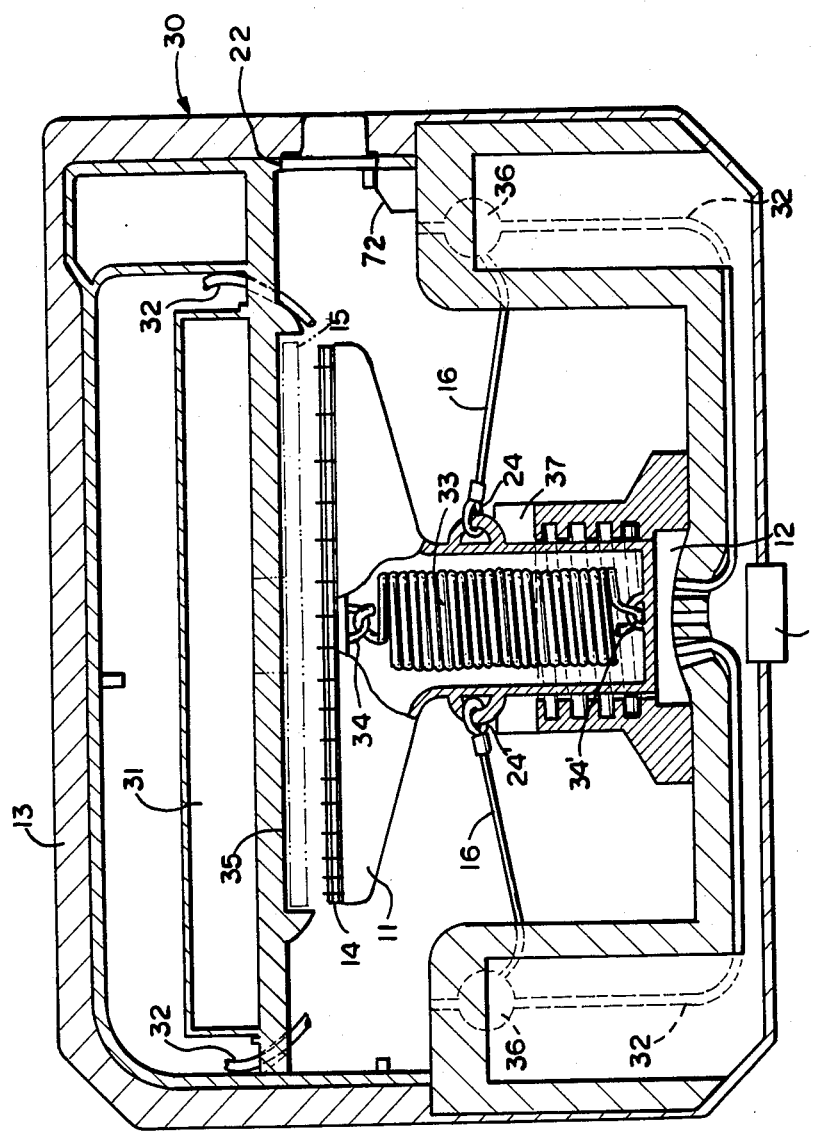

PROTECTION SYSTEM

FIELD OF THE INVENTION

The invention relates to a novel arrangement for destroying audio and/or visual discs, tapes and/or film in a transporter, projector or information retrieval system so as to prevent their disclosure of information through theft by third parties. More particularly, the invention is concerned with a means for destroying information storage discs, audio and/or visual discs in cassettes or disclosure systems to prevent their theft upon the sensing of an intrusion into the system.

BACKGROUND OF THE INVENTION

Governments and industries have needs for securing audio and/or visual recordings which contain proprietary or secret information during transportation and storage. Laser discs and magnetic recording discs in many industries now contain trade secrets which provide a company its competitive edge.

It is now common in governments and industries under a security system to use a flexible magnetic disc on which information useful to a computer system may be magnetically recorded. Such discs permit the computer to access information directly through the disc drive, thus eliminating the necessity of the user entering such information manually. Such prerecorded information is commonly referred to as "software" and, with the advent of inexpensive computers, the sale of such software has evolved into a significant business. Software packages, which include one or a number of such prerecorded discs, have proven extremely popular and are the subject of great competition. Primarily, the cost of software packages is determined by the perceived value of the information provided on the disc rather than the cost of either manufacturing the disc and the jacket or that of recording the information. Unfortunately, information is easily duplicated from one disc to another. The combination of inexpensive discs and partially assembled jackets and readily available means for duplicating recorded information has spawned a large illicit market in the unauthorized duplication and sale of software packages which are not readily distinguishable from authorized counterparts.

The security system in cases of computers is to prevent unauthorized access to the computer or the room where the computer is stored.

It is now known to provide ignition systems which burn or char the contents of cassettes to prevent their unauthorized use or copying. Such systems can be dangerous since fires may occur which cause injury to innocent by-standers and damages the cassette.

Other systems have utilized explosive devices which may also unintentionally injure an innocent party and creates a large noise which may frighten nearby animals and children and damage the holding system.

OBJECTS AND SUMMARY OF THE INVENTION

It is an object of the present invention to provide a means for destroying information storage discs, audio and/or visual discs in transporters, projectors, cassettes or computers in order to maintain security.

It is a further object of the invention to provide a means for securing a projector having a disc cassette or a computer with a disc programming unit against intrusion and/or unauthorized use.

It is a still further object of the invention to provide a security device for a projector having a disc cassette which is inexpensive to manufacture, efficient in operation and does not cause injury to any persons.

These and other objects of the invention can be accomplished by providing audio and visual systems such as a projector which utilizes a recorded disc with means for destroying the disc by tearing or shredding upon the sensing of forced entry or tampering. More specifically, there is provided means for sensing an intrusion into a projector housing containing a disc which is required to be kept confidential, and means responsive to said sensed intrusion for contacting and tearing or shredding the disc.

In a preferred embodiment of the invention, the means for shredding or tearing the disc comprises a rotatable means which is provided with an abrasive member or a cutting member. In the event of tampering or intrusion an impact sensor activates the rotatable member, places the abrasive member or cutting member in contact with the disc and destroys the disc so that it cannot be used or duplicated.

Other objects and a fuller understanding of the invention will be had by referring to the following description and claims of a preferred embodiment, taken in conjunction with the accompanying drawings, wherein like reference characters refer to similar parts throughout the several views.

BREIF DESCRIPTION OF THE DRAWINGS

FIG. 3 is a side view partly in section showing the device of FIG. 1 in a cassette form;

DESCRIPTION OF THE PREFERRED EMBODIMENT OF THE INVENTION

Figure 1:
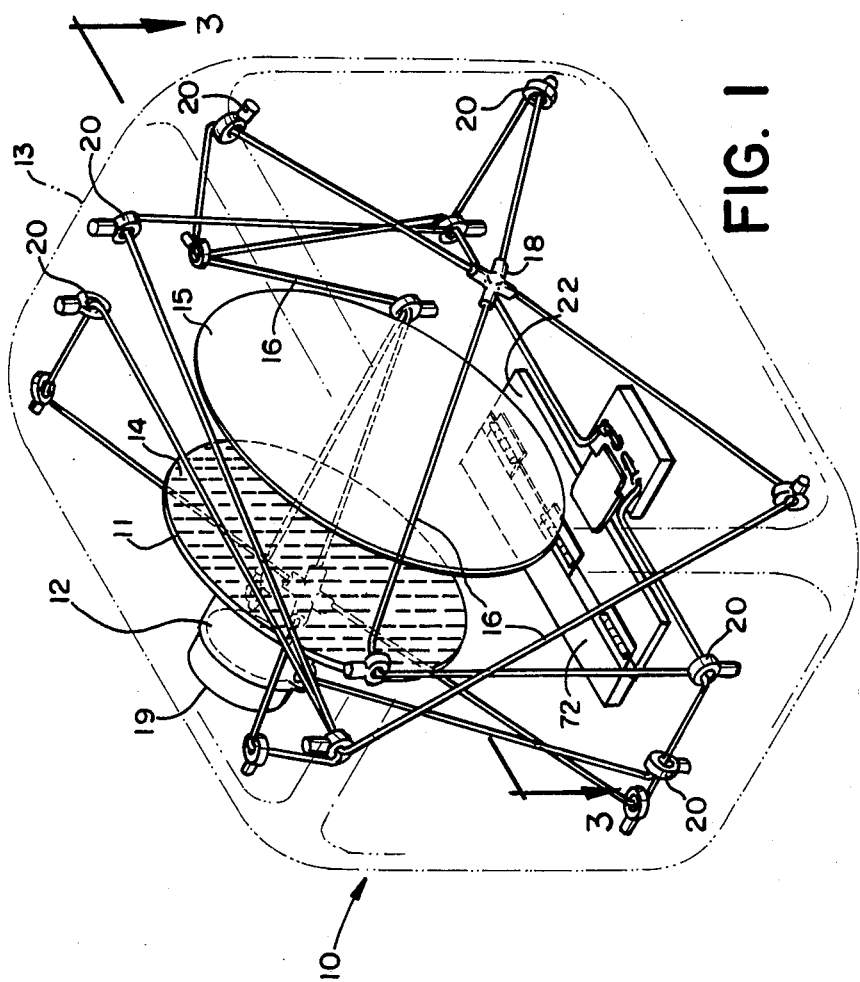
FIG. 1 is an elevation, partly in section disclosing the intrusion sensors and shredder of the invention.

Although specific terms are used in the following description for the sake of clarity, these terms are intended to refer only to the particular structure of the invention selected for illustration in the drawings, and are not intended to define or limit the scope of the invention.

As seen in FIG. 1, the essential components of the security device 10 of the invention comprise a rotatable table 11 mounted on a motor means 12 which is set within a housing 13. On the face of the table 11 is attached an abrasive disc 14. The abrasive disc 14 is mounted adjacent an information storage disc 15 which contains the information to be played and for which the security is intended.

About the inside of the device 10 passes a line or lines 16 under tension. The line 16 is connected through a release mechanism 18 and, after passage about the device 10 through line guides 20, to connectors 24, 24' on the table 11. The line 16 retains the table 11 from contacting the disc 15 and prevents rotation of the table 11.

In operation, the disc 15 is placed into the device 10 through a spring biased door 22 into a disc holder. The restraining means provided is constant while the information storage disc is placed within the housing 13. Any tampering or intrusion into the device 10 will cause the release of the line 16 from release 18. The release of the line 16 in turn frees the motor means 12 to rotate and extend the table 11 into contact with the disc 15 so as to destroy the disc through the rotation.

Figure 2A:
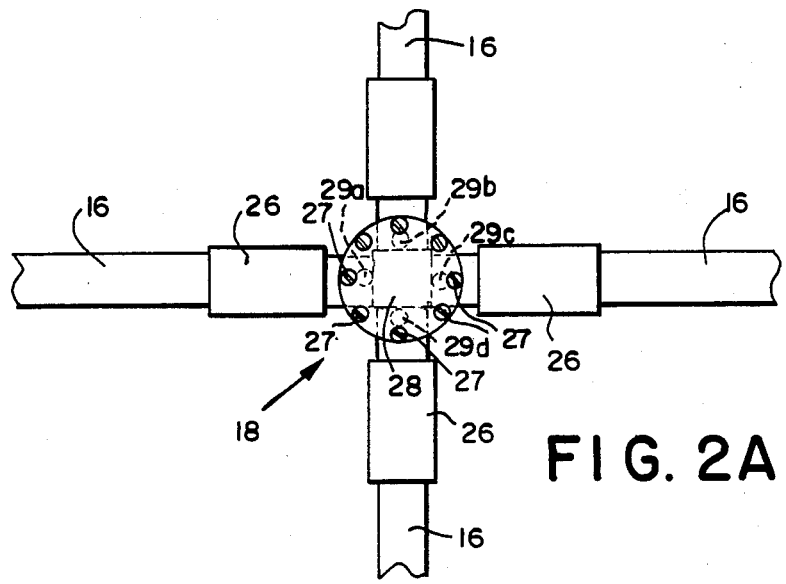
FIGS. 2A and 2B are side elevations partly in section of the impact sensor of FIG. 1.

In FIG. 2A there is shown an impact sensor comprising four way release mechanism 18. The invention will be described with reference to a four-way release, although other releases, particularly two and three way releases are also contemplated. The release mechanism 18 connects the line 16 in a line locking head 26 of the mechanism 18. Optionally, the mechanism 18 is provided with screw openings 27 to permits its fastening to a wall of the housing 13.

Figure 2B:
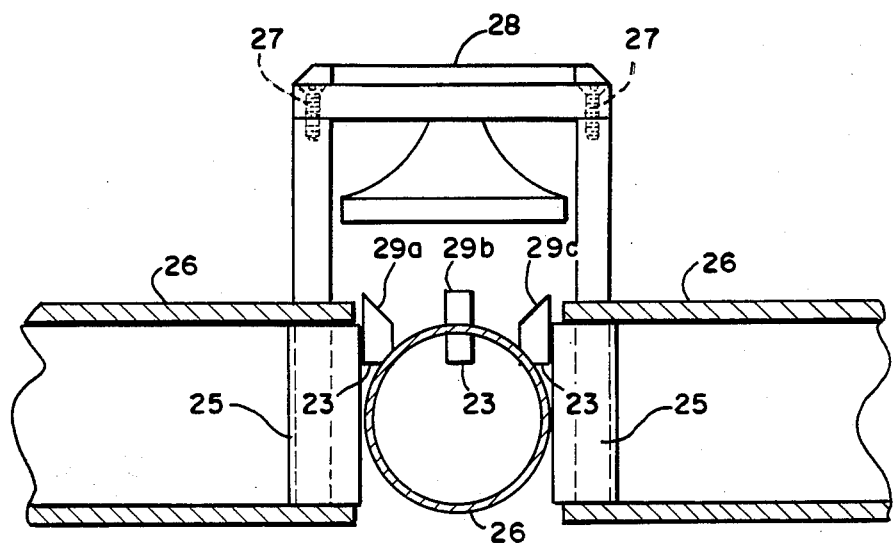

As seen in FIG. 2B, the line 16 has end members 25 of metal or plastic which permits easy insertion of the line 16 into the locking head 26. The end members 25 also provide a surface for mounting the plungers 29a, 29b, 29c and 29d in FIG. 2A which releasably lock the taut end members 25 within the locking heads 26. An anvil 28 may either be fastened to the wall of the housing 13 or on posts (shown in FIG. 2B) connecting to a gravity actuated member which is permitted to fall when outer housing layers are removed. The outer layers can be made from impact absorbing materials that resists intrusion and damage to internal compounds. The anvil 28 acts on the plungers 29a, 29b, 29c and 29d when the housing is attempted to be broken with an impact tool such as a hammer. The plungers 29a, 29b, 29c and 29d, which are normally extended by a spring 23 are driven down by the anvil 28 as a result of the attempted penetration into the housing so as to free the line.

The security feature of the device of the invention is preferably in the form of a cassette 30 shown in FIG. 3. The cassette 30 comprises a housing 13 having a door 22 for inserting a disc 15 into its holder 35 for reading by a reading head in housing 31. Throughout the cassette 30 are guide channels 32 through which pass the line 16. The cassette 30 has housings 36 for the release mechanisms 18 at various locations. The abrasive or shredder disc 14 is attached to the rotatable table 11. The table 11 is connected by connector 34 to a spring 33. A motor means 12 is connected by a connector 34' to the spring 33. The spring 33 is preferably within a spring housing 37 which has an aperture (not shown) to accommodate the connector 34'. It can be seen that the spring 33 is restrained from rotation by connection with the line 16 by means of the connectors 24,24'. When the line 16 is released, the spring 33 moves forward and rotates the shredder or abrasive disc 14 in contact with the disc 15. The electrical contact 19 when connected to an electrical energy source provides the power for an optional internal disc reading head, disc spinning player, motor 12, access door control 72 and bridging element.

The operation of the release mechanism is seen as follows. The line 16 retains the table 11 against movement which otherwise would be caused by the spring 33. The line 16 is thereby under a degree of tension due to the action of the spring 33. The plungers 29a-d retain the end members 25 of the line 16 within the locking heads 26. The line is connected through the release mechanism 18 to the table 11. The anvil 28 acts on the plungers 29a-d to permit the end members 25 of the line 16 to pass through the locking heads 26 and thereby release the table 11 to move under the influence of spring 33 into the disc 15.

A motor 12 can be provided to rotate and extend the table 11 into contact with the disc 15. The spring 33 is the preferred embodiment, although other motor means 12 could be used for this purpose. The spring 33 rotates within a spring housing 37 which has an aperture (not shown) to accommodate the connector 34'. The housing 37 rotates with the table 11 under the force of the spring 33 when the line 16 is released. The unwinding of the spring 33 will cause rotation of the table 11, but this can be assisted by the threads that are visible in FIG. 3. The threads will cause the table 11 and housing 37 to advance, in the manner of a screw.

Figure 4:
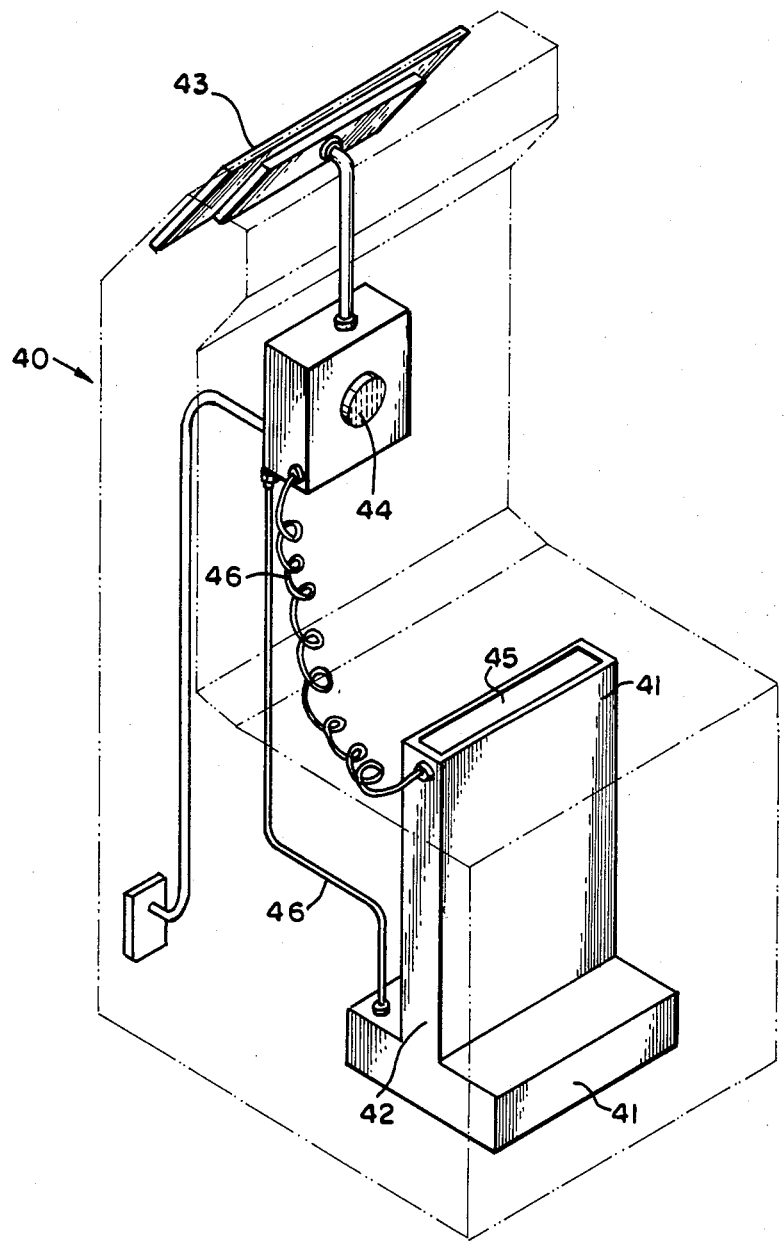
FIG. 4 is a side elevation, partly in section a disc loader for the device of FIG. 3.

In FIG. 4 there is illustrated a module 40 for inserting the disc 15 into the cassette 30. The cassette 30 is connected at member 19 with a male I.D. control 44 on the module 40. The door 22 of the cassette 30 is in alignment with a disc holder 41 that contains a telescoping means 45 which extends the disc 15 through the door 22 into the disc holder 35 of the cassette 30. A power line 46 is attached to a side 42 of the disc holder 41 and delivers the electrical power from the I.D. control 44 which is connected to a control panel 43 and the telescoping means 45. A second power line 46' can also be provided.

Figure 5:
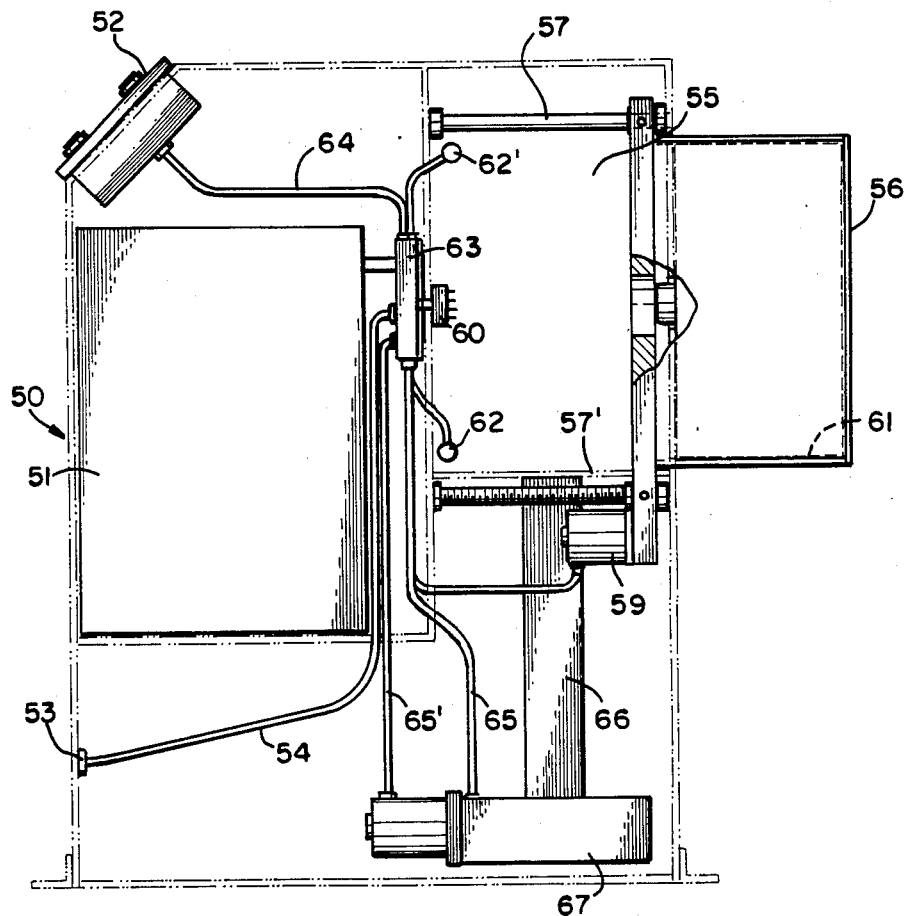
FIG. 5 is a cross section in part of a projector which utilizes the cassette of FIG. 3.

The projector module 50 shown in FIG. 5 is adapted to contain a conventional projecting or playing means (not shown) for the disc 15. The projecting means is placed within the projector housing 51 of module 50. The cassette 30 shown in FIG. 3 is placed in a drawer 56 of the module 50 and then moved into the module 50 along tracks 57,57'. The drawer 56 is driven along the tracks 57,57' by a motor 59 until it places the cassette 30 into an operating condition by connection of contact 19 with the module control connector 60. The drawer 56 is advantageously provided with electrical lines 61 which are placed into contact with contactor points 62,62' upon the closing of the drawer 56.

The operation of the module 50 is controlled through a control panel 52 that is connected to a control center 63 by a line 64. Control panel 52 is also connected to a power connector 53 through line 54.

In order to prevent inactivation by cutting off the power source from line 54, an auxiliary power source such as battery 67 is provided. The battery 67 is connected to the control center 63 through lines 65 and 65'. Optionally, there may also be provided a further reading head (not shown) within the well 66.

Figure 6:
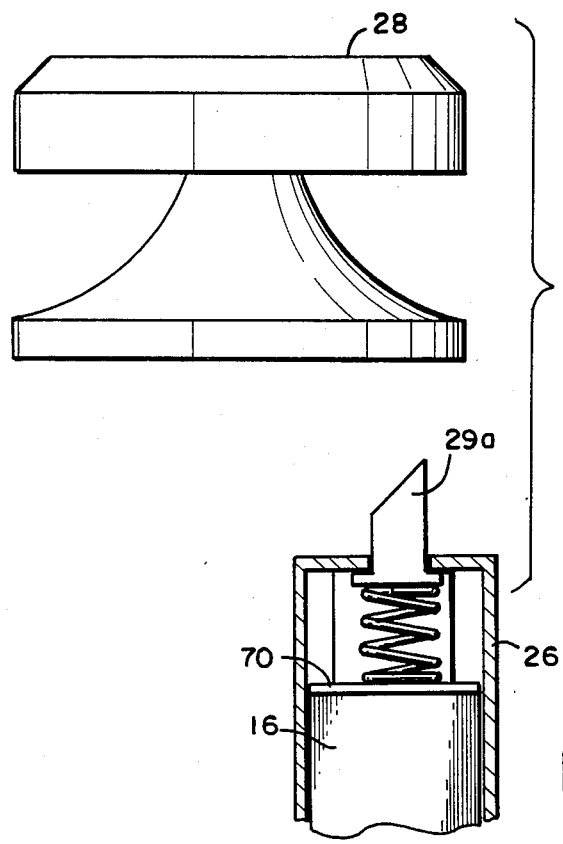
FIG. 6 is a side elevation partly in section of a further impact sensor of the invention.

FIG. 6 illustrates another form of impact sensor shown in FIG. 2A. As seen, the anvil 28 acts upon the plunger 29a by pushing the plunger 29a against the action of a spring which maintains the plunger 29a in a forward position. The plunger 29a acts on the metal or other type end member 70 of the line 16. Action on the end member 70 releases the line 16 which is pressure fitted to remain within the locking head 26. Similarly the anvil 28 acts on the other plungers (as seen in FIGS. 2A and 2B) to start the destruction mechanism into operation.

Although the invention has been described with a certain degree of particularity, it is understood that the present disclosure has been made only by way of example and that numerous changes in the details of construction and the combination and arrangement of parts may be resorted to without departing from the spirit and scope of the invention.

What is claimed is:

1. In an audio and/or video means for transporting or transmitting information on a disc, tape or film, the improvement which comprises a cassette means for preventing unauthorized or unintentional disclosure of the information on said disc, tape or film by removal of said disc, tape or film from said cassette means, said cassette means being provided with means for sensing intrusion into said cassette means, a rotatable abrasive or cutting means, and means for placing said abrasive or cutting means in contact with said disc, tape or film, responsive to a sensed intrusion into said cassette means.

2. The audio and/or video means of claim 1 wherein said rotatable means comprises a spring operated means for rotating said abrasive or cutting means and placing said abrasive or cutting means in contact with said disc, tape or film.

3. The audio and/or video means of claim 2 wherein said sensing means in an impact responsive means.

4. The audio and/or video means of claim 3 wherein said impact responsive means comprises a line extending within said means and line connector means adapted to release said line upon impact whereby the rotatable means is activated.

5. The audio and/or video means of claim 4 wherein said line is held taut by said rotatable means.

6. The audio and/or video means of claim 2 including motor means for winding said spring operated means.

7. The audio and/or video means of claim 1 including door means for inserting said disc, tape or film within said cassette means.

8. The means of claim 1 including impact responsive means for activating said means for placing the abrasive or cutting means in contact with said disc, film or tape.

9. The means of claim 1 wherein said cassette means includes a spring operated means for rotating said abrasive or cutting means and placing said means in contact with said disc, tape or film.

10. The means of claim 9 wherein said rotatable means is held from rotation by an impact responsive means.

11. The means of claim 10 wherein said impact responsive means comprises a line extending within said cassette means and line connector means adapted to release said line upon impact.

12. The means of claim 11 wherein said line is held taut by said rotatable means.

13. In an audio and/or video system for tranferring information stored on a disc, tape or film, the improvement comprising a cassette means for preventing the unauthorized or unintentional disclosure of said information on said disc, tape or film by intrusion into said cassette means, said cassette means being provided with access means for authorized retrieval of said information on said disc, tape or film, means for sensing unauthorized intrusion into said cassette means, an abrasive or cutting means, and means for moving said abrasive or cutting means in destructive contact with said disc, tape or film, when said means for sensing intrusion senses intrusion into said cassette.

14. The system of claim 13, wherein said means for moving said abrasive or cutting means comprises spring operated means.

15. The system of claim 14, wherein said sensing means is an impact responsive means.

16. The system of claim 15, wherein said impact responsive means comprises a line extending within said cassette means, and line connector means adapted to release said line upon impact whereby the abrasive or cutting means is activated.

17. The system of claim 16, wherein said line is held taut by said spring operated abrasive or cutting means.

18. The system of claim 14, wherein said cassette means comprises motor means for winding said spring operated means.

19. The system of claim 13, wherein said cassette means comprises door means for inserting said disc, tape or film within said cassette means.

20. The system of claim 19, wherein said door means are adapted to receive guidance means for inserting said disc, tape or film into said cassette means.

21. The system of claim 20, further comprising information retrieval means adapted for entry into said cassette means through said door means and for retrieving information stored on said disc, tape or film.

22. The system of claim 21, wherein said information retrieval means comprises an auxiliary power source.

23. The system of claim 21, wherein said cassette means includes a spring operated means for moving said abrasive or cutting means and placing said means in contact with said disc, tape or film.

24. The system of claim 23, wherein said moving means is held from movement by an impact responsive means.

25. The system of claim 24, wherein said impact responsive means comprises a line extending within said cassette means and line connector means adapted to release said line upon impact.

26. The system of claim 25, wherein said line is held taut by said moving means.

* * * * *